March 29, 1955   W. B. HOWICK   2,705,040
ALIGNING DEVICE FOR VEHICLES
Filed Aug. 19, 1952   3 Sheets-Sheet 1

Walter B. Howick
INVENTOR.

Walter B. Howick
INVENTOR.

March 29, 1955  W. B. HOWICK  2,705,040
ALIGNING DEVICE FOR VEHICLES
Filed Aug. 19, 1952  3 Sheets-Sheet 3
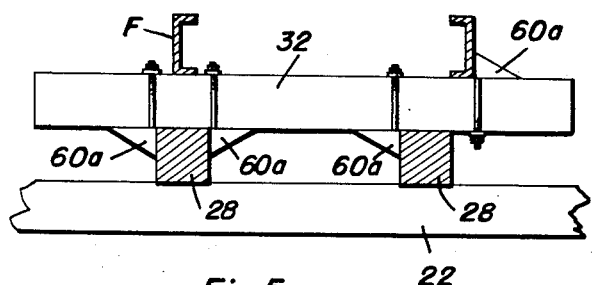
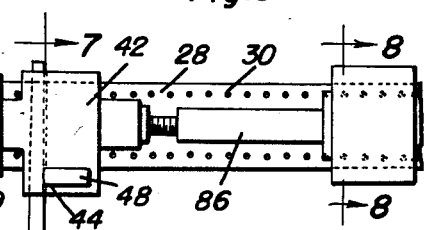
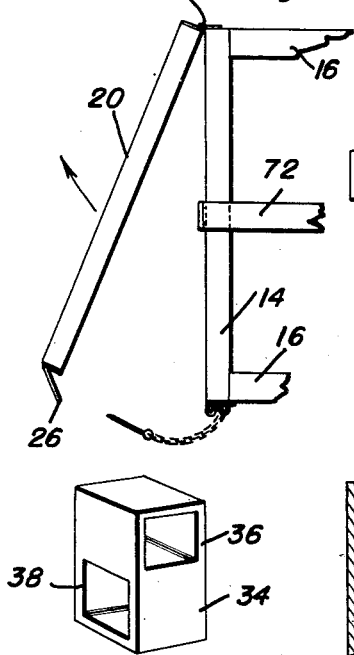
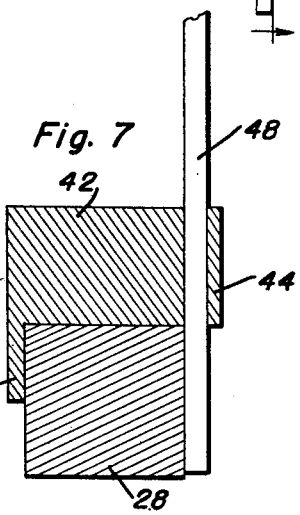
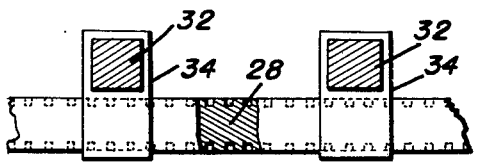
Walter B. Howick
INVENTOR.

United States Patent Office 2,705,040
Patented Mar. 29, 1955

2,705,040

ALIGNING DEVICE FOR VEHICLES

Walter B. Howick, Meadville, Pa.

Application August 19, 1952, Serial No. 305,265

9 Claims. (Cl. 153—32)

This invention relates to new and useful improvements in apparatus for straightening vehicle frames and the primary object of the present invention is to provide a supporting frame for vehicles having longitudinally adjustable pulling members thereon that will engage the forward and rear ends of a vehicle frame and which members may be individually adjustable to twist a vehicle frame into proper alignment.

Another important object of the present invention is to provide an aligning device for vehicles including a pair of spaced parallel longitudinal beams each of which slidably supports forward and rear pulling members, forward and rear longitudinally adjustable abutments, and forward and rear jacks disposed between the pulling members and the abutments, whereby the pulling members may be independently adjusted longitudinally of the beams.

A further object of the present invention is to provide an aligning device of the aforementioned character involving an upper beam supporting hoist means for engagement with a vehicle frame and jack means on the longitudinal beams and connected to a vehicle frame to coact with the hoist means in permitting vertical bending of a vehicle frame into proper alignment.

A still further aim of the present invention is to provide a vehicle frame straightening device that is extremely strong and reliable in use, simple and practical in construction, efficient and durable in operation, inexpensive to produce, assemble and maintain, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, in which:

Figure 5 is a fragmentary plan view of Figure 1 and showing the gate in a partially open position;

Figure 6 is an enlarged fragmentary plan view of Figure 3 to show one of the pulling members, an abutment and the jack disposed between the member and the abutment;

Figure 7 is an enlarged vertical sectional view taken substantially on the plane of section line 7—7 of Figure 6;

Figure 8 is an enlarged vertical sectional view taken substantially on the plane of section line 8—8 of Figure 6;

Figure 10 is a perspective veiw of one of the slides connecting the pulling members to the longitudinal beams;

Figure 12 is an enlarged fragmentary longitudinal vertical sectional view taken substantially on the plane of section line 12—12 of Figure 2 to show the manner in which the cross-bolsters are slidably connected to the longitudinal beams;

Figure 13 is a perspective view of one of the connections between the cross-bolsters and the longitudinal beams; and Figure 14 is a transverse vertical sectional view of the device and showing the abutments arranged on the cross-bolsters and engaging a vehicle frame.

Figure 1:
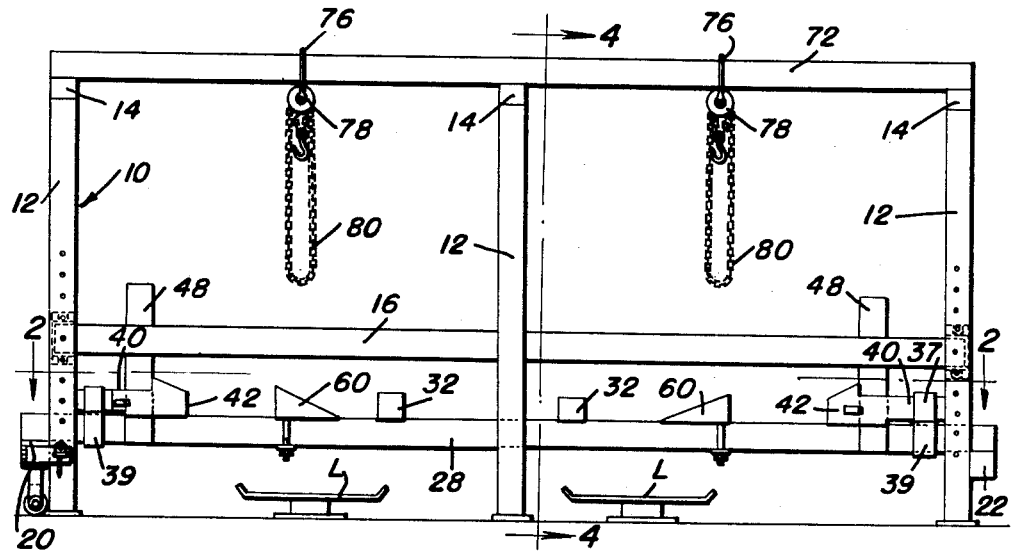
Figure 1 is a side elevational view of the present invention, the jacks removed therefrom.

Referring now to the drawings in detail, wherein for the purpose of illustration, there is disclosed a preferred embodiment of the present invention, the numeral 10 represents the frame generally, including a plurality of inverted U-shaped supports each of which includes a pair of vertical post-forming portions 12 and a horizontal portion 14 connecting the upper ends of the post-forming portions 12.

Longitudinal connecting beams 16 extend horizontally between the post-forming portions 12 and the ends of the beams 16 are vertically adjustably secured to the portions 12 of the two end supports by vertically adjustable mounting brackets 18. Cross-beams 20 and 22 are secured to the portions 12 of the two end supports. One of the cross-beams, for example cross-beam 20, is hinged, as at 24 to its support and its free end is removably engaged with its support by a hasp or the like 26.

Figure 2:
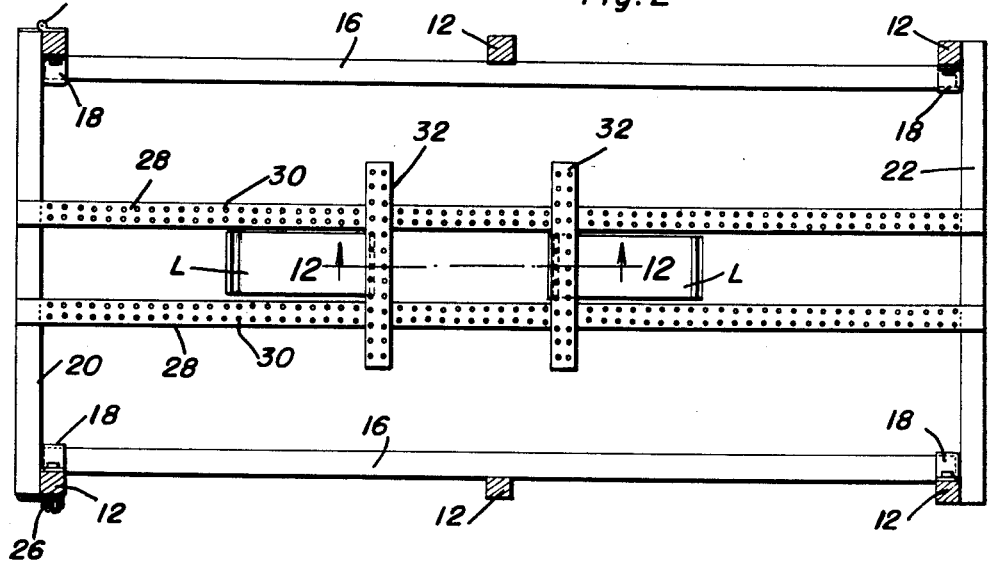
Figure 2 is a horizontal sectional view taken substantially on the plane of section line 2—2 of Figure 1.

A pair of longitudinal beams 28 are supported upon the cross-beams 20 and 22 as shown in Figure 2. The longitudinal beams 28 are formed with longitudinally spaced depressions or lugs seats 30 for a purpose presently to be described. A pair of spaced parallel cross-bolsters 32 are supported upon the longitudinal beams 28 and means is provided for slidably adjustably connecting the cross-bolsters to the longitudinal beams in the form of connector blocks 34 having upper and lower relatively perpendicular horizontal openings 36 and 38. The upper openings 36 receive the cross-bolsters and the lower openings 38 receive the longitudinal beams.

Forward and rear pulling members or pullers are received in the upper sleeves 37 of double sleeved guides 39 of each longitudinal beam. The pulling members each include a long rigid body portion 40 having a head 42 at one end. The flat lower surface of the portions 40 and heads 42 rest against the upper faces of the longitudinal beams and the heads 42 are formed with depending flanges 43 that rest against a side face of the beams 28 (Figure 7). The heads 42 are provided with overhangs that are formed with vertical slots 44 offset from the beams 28. Removable keys 46 secure vertical pulling bars 48 in the slots 44.

Figure 9:
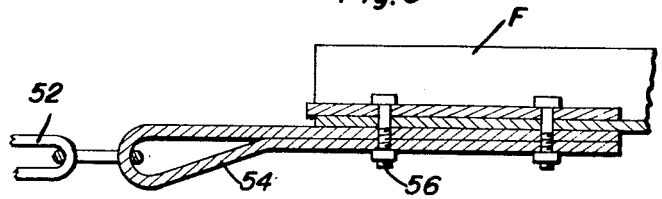
Figure 9 is an enlarged detail vertical sectional view of one of the anchoring means for one of the pulling members.
Figure 4:
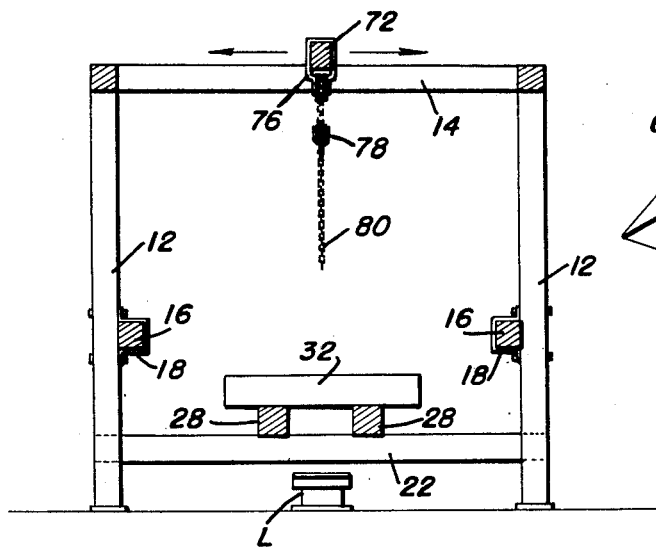
Figure 4 is a vertical sectional view taken substantially on the plane of section line 4—4 of Figure 1.
Figure 11:
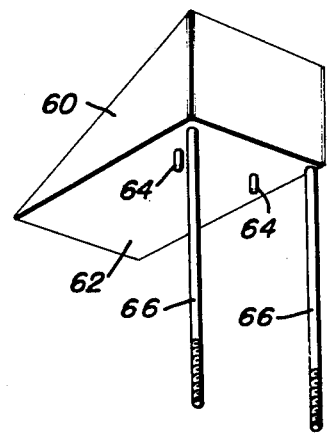
Figure 11 is a perspective view of one of the abutments used in the invention.
Figure 3:
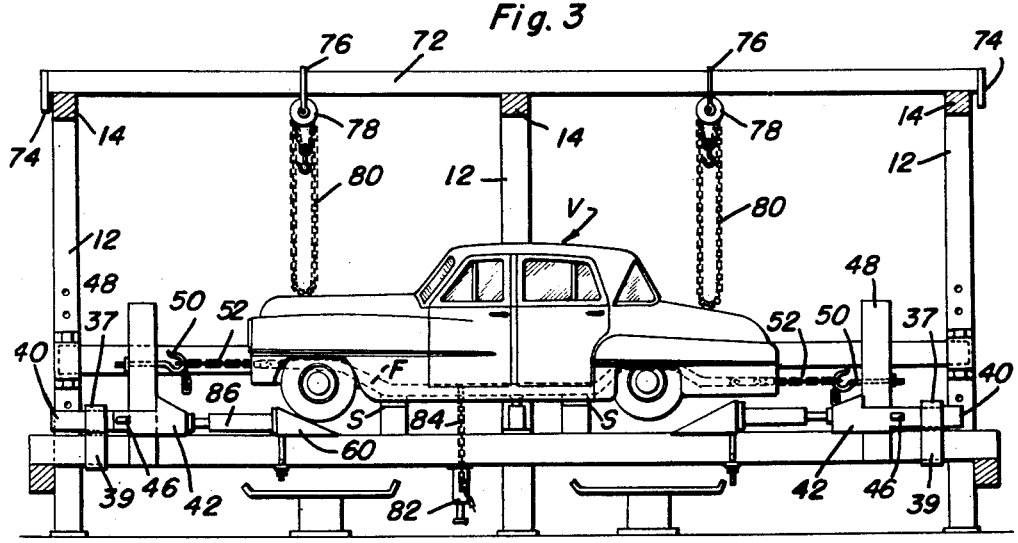
Figure 3 is a longitudinal vertical sectional view of Figure 1 and showing the forward and rear pulling members engaged with the ends of a vehicle frame and the jacks engaged with the pulling members.

Hooks 50 are secured to the upper portions of the pulling bars 48 and engage chains 52 to which anchoring elements are secured. The anchoring elements (Figure 9) include U-shaped straps 54 whose limbs support fasteners 56 that are removably attached to the ends of a vehicle frame F.

Forward and rear abutments 60 are slidably adjustably received on the longitudinal beams 28. The abutments 60 include flat lower faces 62 that rest upon the beams 28 and from which depend rigid lugs 64 for selectively entering the seats 30. A pair of depending vertical rods 66 are fixed to each abutment for receiving the beams 28 therebetween. Clamping straps 68 extend under the beams 28 and are formed with end apertures that receive the lower threaded ends of the rods 66. Nuts 70 are threaded on the lower ends of the rods 66 and clamp the straps 68 against the lower faces of the beams 28 and the abutments 60 against the upper faces of the beams 28.

An upper longitudinal beam 72 is supported upon the portions 14 and includes end flanges 74 for engaging the portions 14 of the end supports in order to restrict longitudinal sliding movement of the beam 72 and to permit only transverse sliding movement of the beam 72. Hoist means in the form of pulley holding slides 76 are slidable on the beam 72 and carry pulleys 78 having cables or chains 80 thereon for attachment to a vehicle frame.

Jacks 82 engage the undersides of beams 28 and are attached to a vehicle frame F by chains 84 to exert a downward pull on the frame and to coact with the hoist means in bending the vehicle frame vertically.

Additional jacks 86 are interposed between the abutments and the pulling members to move the latter longitudinally of the beams 28.

In practical use of the present invention, the gate forming beam 20 is opened and the wrecked vehicle V is moved between the end supports 12, 14 and over lifts L which are actuated to raise the vehicle. Then, the beams 28 are inserted on the cross-beams 20 and 22 and under the vehicle after which the bolsters 32 are moved under the vehicle frame. Spacers S are disposed between the vehicle frame and the bolsters.

The pulling members are then applied to the beams 28 and attached to the ends of the frame F. The abutments are also applied to the beams 28 and longitudinally adjusted on the beams 28. Then the jacks 86 are installed between the abutments and the pulling members to slide the latter and twist the frame F straight.

The beams 28 may be locked or returned in spaced parallel relation by additional abutments 60a which are adjusted to the cross-bolsters and which engage the beams 28 as shown in Figure 14.

When it is desired to bend the frame of the vehicle in a vertical direction, the hoist means are connected to the frame for exerting an upward pull in the area to be bent. The jacks 82 and chain 84 are used in connection with the hoist means for exerting a downward pull in the area of the frame which is not to be bent upwardly when the hoist means are being used.

Having described the invention, what is claimed as new is:

1. An aligning device for vehicles comprising a plurality of U-shaped supports, means connecting and spacing the supports, said supports including a pair of end supports, horizontally disposed transverse beams secured to the end supports, one of said beams being pivoted at one end to one of said supports and having the other end thereof movable toward and away from the other support of one of said pairs of supports, a pair of spaced parallel longitudinal beams removably supported on said transverse beams, a pair of cross-bolsters extending between and supported on said longitudinal beams, and forward and rear pullers slidably adjustably mounted on said longitudinal beams and having means for removably engaging the ends of a vehicle frame.

2. An aligning device for vehicles comprising a plurality of U-shaped supports, means connecting and spacing the supports, said supports including a pair of end supports, horizontally disposed transverse beams secured to the end supports, one of said beams being pivoted at one end to one of said supports and having the other end thereof movable toward and away from the other support of one of said pairs of supports, a pair of spaced parallel longitudinal beams removably supported on said transverse beams, a pair of cross-bolsters extending between and supported on said longitudinal beams, forward and rear pullers slidably mounted on the ends of the longitudinal beams and adapted to be attached to the ends of a vehicle frame, and means supported on the longitudinal beams for adjusting the pullers longitudinally of the longitudinal beams.

3. An aligning device for vehicles comprising a plurality of U-shaped supports, means connecting and spacing the supports, said supports including a pair of end supports, horizontally disposed transverse beams secured to the end supports, one of said beams being pivoted at one end to one of said supports and having the other end thereof movable toward and away from the other support of one of said pairs of supports, a pair of spaced parallel longitudinal beams removably supported on said transverse beams, a pair of cross-bolsters extending between and supported on said longtudinal beams, forward and rear pullers slidably mounted on the ends of the longitudinal beams and adapted to be attached to the ends of a vehicle frame, and means supported on the longitudinal beams for adjusting the pullers longitudinally of the longitudinal beams, each of said pullers including a rigid slide block, said blocks overlying and contacting the longitudinal beams, a depending flange on each block, said flanges engaging the sides of the longitudinal beams, each block having a vertical slot offset from the beams and puller bars in the slots and supporting the means engaging the ends of the vehicle frame.

4. An aligning device for vehicles comprising a plurality of U-shaped supports, means connectng and spacing the supports, said supports including a pair of end supports, horizontally disposed transverse beams secured to the end supports, one of said beams being pivoted at one end to one of said supports and having the other end thereof movable toward and away from the other support of one of said pairs of supports, a pair of spaced parallel longitudinal beams removably supported on said transverse beams, a pair of cross-bolsters extending between and supported on said longitudinal beams, forward and rear pullers slidably mounted on the ends of the longitudinal beams and adapted to be attached to the ends of a vehicle frame, forward and rear abutments longitudinally adjustably supported on the longitudinal beams, and adjustable means between the pullers and the abutments for adjusting the pullers longitudinally on said longitudinal beams.

5. An aligning device for vehicles comprising a plurality of U-shaped supports, means connecting and spacing the supports, said supports including a pair of end supports, horizontally disposed transverse beams secured to the end supports, one of said beams being pivoted at one end to one of said supports and having the other end thereof movable toward and away from the other support of one of said pairs of supports, a pair of spaced parallel longitudinal beams removably supported on said transverse beams, a pair of cross-bolsters extending between and supported on said longitudinal beams, forward and rear pullers slidably mounted on the ends of the longitudinal beams and adapted to be attached to the ends of a vehicle frame, forward and rear abutments longitudinally adjustably supported on the longitudinal beams, and adjustable means bewteen the pullers and the abutments for adjusting the pullers longitudinally on said longitudinal beams, said adjustable means including jacks having bases engaging the abutments and longitudinally movable rods engaging the pullers.

6. An aligning device for vehicles comprising a plurality of U-shaped supports, means connecting and spacing the supports, said supports including a pair of end supports, horizontally disposed transverse beams secured to the end supports, one of said beams being pivoted at one end to one of said supports and having the other end thereof movable toward and away from the other support of one of said pairs of supports, a pair of spaced parallel longitudinal beams removably supported on said transverse beams, a pair of cross-bolsters extending between and supported on said longitudinal beams, forward and rear pullers slidably mounted on the ends of the longitudinal beams and adapted to be attached to the ends of a vehicle frame, and means supported on the longitudinal beams for adjusting the pullers longitudinally of the longitudinal beams, each of said pullers including a rigid slide block, said blocks overlying and contacting the longitudinal beams, a depending flange on each block, said flanges engaging the sides of the longitudinal beams, each block having a vertical slot offset from the beams and puller bars in the slots and supporting the means engaging the ends of the vehicle frame, and keys removably securing said puller bars in said slots.

7. An aligning device for vehicles comprising a plurality of U-shaped supports, means connecting and spacing the supports, said supports including a pair of end supports, horizontally disposed transverse beams secured to the end supports, one of said beams being pivoted at one end to one of said supports and having the other end thereof movable toward and away from the other support of one of said pairs of supports, a pair of spaced parallel longitudinal beams removably supported on said transverse beams, a pair of cross-bolsters extending between and supported on said longitudinal beams, and forward and rear pullers slidably adjustably mounted on said longitudinal beams and having means for removably engaging the ends of a vehicle frame, said supports being provided with horizontal portions, upper beams slidable on said horizontal portions, and pulley slides slidable on said upper beams and adapted to support pulleys having hoist cables thereon whereby a vehicle may be suspended from the upper beam.

8. An aligning device for vehicles comprising a plurality of U-shaped supports, means connecting and spacing the supports, said supports including a pair of end supports, horizontally disposed transverse beams secured to the end supports, one of said beams being pivoted at one end to one of said supports and having the other end thereof movable toward and away from the other support of one of said pairs of supports, a pair of spaced parallel longitudinal beams removably supported on said transverse beams, a pair of cross-bolsters extending between and supported on said longitudinal beams, forward and rear pullers slidably mounted on the ends of the longitudinal beams and adapted to be attached to the ends of a vehicle frame, forward and rear abutments slidably adjustably mounted on the longitudinal beams, said abutments having flat lower faces resting upon the longitudinal beams and depending lugs on said lower faces, said longitudinal beams having spaced apertures for selectively receiving said lugs, clamping means between the abutments and the longitudinal beams, and jacks between the abutments and the pullers for adjusting the pullers longitudinally of the longitudinal beams.

9. An aligning device for vehicles comprising a plurality of U-shaped supports, means connecting and spacing the supports, said supports including a pair of end supports, horizontally disposed transverse beams secured to the end supports, one of said beams being pivoted at one end to one of said supports and having the other end thereof movable toward and away from the other support of one of said pairs of supports, a pair of spaced parallel longitudinal beams removably supported on said transverse beams, a pair of cross-bolsters extending between and supported on said longitudinal beams, forward and rear pullers slidably mounted on the ends of a vehicle frame, forward and rear abutments slidably adjustably mounted on the longitudinal beams, said abutments having flat lower faces resting upon the longitudinal beams and depending lugs on said lower faces, said longitudinal beams having spaced apertures for selectively receiving said lugs, clamping means between the abutments and the longitudinal beams, and jacks between the abutments and the pullers for adjusting the pullers longitudinally of the longitudinal beams, said clamping means including pairs of rigid rods depending from the abutments and receiving the longitudinal beams therebetween, the lower ends of said rods being threaded, clamping straps resting against the undersides of said longitudinal frame and having end apertures receiving the ends of said rods, and nuts threaded on the ends of the rods forcing the straps against the undersides of the longitudinal beams and the lower faces of the abutments against the upper faces of the longitudinal beams.

References Cited in the file of this patent

UNITED STATES PATENTS

| | | |
|---|---|---|
| 1,773,187 | Johnson | Aug. 19, 1930 |
| 2,022,912 | Heineman | Dec. 3, 1935 |
| 2,140,686 | Bennett | Dec. 20, 1938 |
| 2,442,939 | Schram | June 8, 1948 |
| 2,559,250 | Jackson | July 3, 1951 |